US009305384B2

(12) United States Patent
Tan et al.

(10) Patent No.: US 9,305,384 B2
(45) Date of Patent: Apr. 5, 2016

(54) HYBRID IMAGE DECOMPOSITION AND PROJECTION

(75) Inventors: Weining Tan, Mississauga (CA); Steven Charles Read, Mississauga (CA)

(73) Assignee: IMAX EMEA Limited, Dublin (IE)

( * ) Notice: Subject to any disclaimer, the term of this patent is extended or adjusted under 35 U.S.C. 154(b) by 102 days.

(21) Appl. No.: 14/238,585

(22) PCT Filed: Aug. 14, 2012

(86) PCT No.: PCT/IB2012/054133
§ 371 (c)(1),
(2), (4) Date: Feb. 12, 2014

(87) PCT Pub. No.: WO2013/024430
PCT Pub. Date: Feb. 21, 2013

(65) Prior Publication Data
US 2014/0192076 A1 Jul. 10, 2014

Related U.S. Application Data

(60) Provisional application No. 61/575,117, filed on Aug. 16, 2011.

(51) Int. Cl.
*G06T 11/60* (2006.01)
*G06T 5/00* (2006.01)
(Continued)

(52) U.S. Cl.
CPC .............. *G06T 11/60* (2013.01); *G06T 3/0093* (2013.01); *G06T 5/002* (2013.01); *G06T 5/007* (2013.01); *G06T 11/001* (2013.01); *H04N 9/3147* (2013.01)

(58) Field of Classification Search
CPC ....... G06T 17/20; G06T 17/205; G06T 15/04; G06T 11/40; G06T 15/005; G06T 11/60; G09G 5/14; G09G 2340/10; G09G 2340/125; H04N 5/44504
See application file for complete search history.

(56) References Cited

U.S. PATENT DOCUMENTS 4,523,226 A 6/1985 Lipton et al.
4,868,773 A 9/1989 Coyle et al.
(Continued)

FOREIGN PATENT DOCUMENTS

CN 1367883 9/2002
CN 1417637 5/2003
(Continued)

OTHER PUBLICATIONS

XLM HD30—The ultimate high-brightness projector for high-resolution multi-windowing, URL:http://www.projectorcentral.com/pdf/projector_spec_3403.pdf, XP55014864, Jul. 1, 2006, 4 pages.
(Continued)

*Primary Examiner* — Todd Buttram
(74) *Attorney, Agent, or Firm* — Kilpatrick Townsend & Stockton LLP

(57) ABSTRACT

Hybrid image projection systems and methods can superimpose image components of an input image. An input image can be divided into smaller regions and at least one parameter of each region can be determined. The input image can be decomposed based on the parameter of each region into multiple, less correlated, orthogonal or quasi-orthogonal image components. Each projector can display respective image components so that the images projected may be optically superimposed on a screen. The superposition of orthogonal or quasi-orthogonal image components can result in superposition of images in an existing multi-projector image systems being more insensitive to inter-projector image misalignment. Superimposing orthogonal or quasi-orthogonal images can be used to avoid visible image degradation, and provide more robust image quality in a multiple projector system implementation.

19 Claims, 11 Drawing Sheets

(51) Int. Cl.
*G06T 3/00* (2006.01)
*G06T 11/00* (2006.01)
*H04N 9/31* (2006.01)

(56) References Cited

U.S. PATENT DOCUMENTS

| | | | |
|---|---|---|---|
| 5,070,403 A | 12/1991 | Wilkinson | |
| 5,384,869 A | 1/1995 | Wilkinson et al. | |
| 5,561,474 A | 10/1996 | Kojima et al. | |
| 5,631,975 A * | 5/1997 | Riglet et al. | 382/173 |
| 5,654,805 A | 8/1997 | Boon | |
| 5,663,775 A | 9/1997 | Kawamura et al. | |
| 5,920,652 A | 7/1999 | Wilkinson | |
| 6,018,596 A | 1/2000 | Wilkinson | |
| 6,243,070 B1 | 6/2001 | Hill et al. | |
| 6,396,505 B1 | 5/2002 | Lui et al. | |
| 6,703,988 B1 * | 3/2004 | Fergason | 345/6 |
| 6,733,138 B2 | 5/2004 | Raskar | |
| 6,751,006 B2 | 6/2004 | Zhou et al. | |
| 6,760,075 B2 | 7/2004 | Mayer et al. | |
| 6,804,406 B1 | 10/2004 | Chen | |
| 6,843,564 B2 | 1/2005 | Putilin et al. | |
| 6,984,043 B2 | 1/2006 | Nakamura et al. | |
| 7,002,533 B2 | 2/2006 | Sayag | |
| 7,079,157 B2 | 7/2006 | Deering | |
| 7,097,311 B2 | 8/2006 | Jaynes et al. | |
| 7,111,941 B2 | 9/2006 | Allen et al. | |
| 7,127,084 B1 | 10/2006 | Mauk | |
| 7,339,625 B2 | 3/2008 | Matthys et al. | |
| 7,357,517 B2 | 4/2008 | Hasegawa | |
| 7,660,470 B2 | 2/2010 | Yano | |
| 7,676,072 B2 | 3/2010 | Sugiyama | |
| 7,740,361 B2 | 6/2010 | Jaynes et al. | |
| 7,852,327 B2 | 12/2010 | Chen et al. | |
| 7,866,832 B2 | 1/2011 | Jaynes et al. | |
| 7,891,818 B2 | 2/2011 | Christensen et al. | |
| 7,936,361 B2 | 5/2011 | Aufranc et al. | |
| 7,954,954 B2 | 6/2011 | Aufranc et al. | |
| 8,016,426 B2 | 9/2011 | Artonne et al. | |
| 8,453,148 B1 * | 5/2013 | Hobbs | 718/102 |
| 8,842,222 B2 | 9/2014 | Iversen | |
| 2001/0024231 A1 | 9/2001 | Nakamura et al. | |
| 2002/0027608 A1 | 3/2002 | Johnson et al. | |
| 2002/0196538 A1 | 12/2002 | Lantz et al. | |
| 2004/0001184 A1 * | 1/2004 | Gibbons et al. | 353/31 |
| 2004/0085256 A1 | 5/2004 | Hereld et al. | |
| 2004/0239885 A1 | 12/2004 | Jaynes et al. | |
| 2005/0036673 A1 * | 2/2005 | Ohba et al. | 382/154 |
| 2005/0082990 A1 * | 4/2005 | Elliott | 315/364 |
| 2006/0033890 A1 | 2/2006 | Hasegawa | |
| 2006/0221249 A1 | 10/2006 | Lin et al. | |
| 2007/0024764 A1 | 2/2007 | Chung | |
| 2007/0091277 A1 | 4/2007 | Damera-Venkata et al. | |
| 2007/0132965 A1 | 6/2007 | Damera-Venkata et al. | |
| 2007/0133794 A1 | 6/2007 | Cloutier et al. | |
| 2007/0171380 A1 | 7/2007 | Wright et al. | |
| 2007/0285663 A1 * | 12/2007 | Hewitt et al. | 356/399 |
| 2008/0143969 A1 | 6/2008 | Aufranc et al. | |
| 2008/0143978 A1 | 6/2008 | Damera-Venkata et al. | |
| 2008/0266321 A1 | 10/2008 | Aufranc et al. | |
| 2008/0297451 A1 * | 12/2008 | Marcu | 345/77 |
| 2008/0309884 A1 | 12/2008 | O'Dor et al. | |
| 2009/0027304 A1 | 1/2009 | Aufranc et al. | |
| 2009/0102915 A1 | 4/2009 | Arsenich | |
| 2009/0213337 A1 | 8/2009 | Kondo et al. | |
| 2009/0244684 A1 | 10/2009 | Gollier | |
| 2009/0273719 A1 | 11/2009 | Kuwata et al. | |
| 2009/0278918 A1 * | 11/2009 | Marcus et al. | 348/54 |
| 2010/0008568 A1 * | 1/2010 | Curti et al. | 382/164 |
| 2010/0177112 A1 | 7/2010 | Miyasaka et al. | |
| 2010/0201682 A1 * | 8/2010 | Quan et al. | 345/419 |
| 2011/0057943 A1 | 3/2011 | Ivashin et al. | |
| 2011/0199586 A1 | 8/2011 | Morikuni | |
| 2011/0234920 A1 | 9/2011 | Nelson | |
| 2013/0093805 A1 | 4/2013 | Iversen | |
| 2013/0201403 A1 | 8/2013 | Iversen | |
| 2014/0292817 A1 | 10/2014 | Iversen et al. | |
| 2014/0300708 A1 | 10/2014 | Iversen et al. | |

FOREIGN PATENT DOCUMENTS

| | | |
|---|---|---|
| CN | 1735173 | 2/2006 |
| CN | 1988674 | 6/2007 |
| CN | 101180873 | 5/2008 |
| CN | 101507286 | 8/2009 |
| CN | 103026381 | 4/2013 |
| CN | 103119946 | 5/2013 |
| DE | 2827622 | 1/1980 |
| DE | 19545356 | 5/1996 |
| EP | 1460856 | 9/2004 |
| JP | 09046553 | 2/1997 |
| JP | 2000184317 | 6/2000 |
| JP | 2005054632 | 2/2006 |
| JP | 2008539675 | 11/2008 |
| JP | 2009206665 | 9/2009 |
| JP | 2009260932 | 11/2009 |
| JP | 2011040958 | 2/2011 |
| WO | 2004039085 | 5/2004 |
| WO | 2006116536 | 11/2006 |
| WO | 2010147451 | 12/2010 |
| WO | 2011134834 | 11/2011 |
| WO | 2011160629 | 12/2011 |
| WO | 2013024430 | 2/2013 |
| WO | 2013057714 | 4/2013 |
| WO | 2013057717 | 4/2013 |

OTHER PUBLICATIONS

U.S. Appl. No. 13/641,676, Non Final Office Action mailed on Nov. 26, 2013, 13 pages.
Jacobson et al., Linear Fusion of Image Sets for Display, IEEE Transactions on Geoscience and Remote Sensing, IEEE Service Center, Piscataway, NJ, US, vol. 45, No. 10, XP011192516, ISSN: 0196-2892, DOI : 10.1109/TGRS. 2007. 903598, Oct. 1, 2007, pp. 3277-3288.
Li et al., Optical blending for multi-projector display wall systems, IEEE LEOS 12th Annual Meeting Conference Proceedings, Leos' 99, vol. 1, XPOI0361258, DOI: 10.1109/LEOS.1999.813592 ISBN : 978-0-7803-5634-4, Nov. 8, 1999, 2 pages.
Mayer, Design Considerations and Applications for Innovative Display Options Using Projector Arrays, Proceedings of SPIE—The International Society for Optical Engineering, Jan. 28, 1996, vol. 2650, pp. 131-139.
Okatani et al., Study of Image Quality of Superimposed Projection Using Multiple Projectors, IEEE Transactions On Image Processing, IEEE Service Center, vol. 18, No. 2, XP011249562, ISSN: 1057-7149, Feb. 2009, pp. 424-429.
International Application No. PCT/DK2011/000066, International Search Report and Written Opinion mailed on Sep. 28, 2011, 9 pages.
International Application No. PCT/EP2011/056173, International Search Report and Written Opinion mailed on Jan. 6, 2012, 10 pages.
International Application No. PCT/IB2012/055749, International Search Report and Written Opinion mailed on Jan. 23, 2013, 7 pages.
International Application No. PCT/IB2012/054133, International Search Report and Written Opinion mailed on Jan. 8, 2013, 8 pages.
International Application No. PCT/IB2012/055754, International Search Report & Written Opinion mailed on Feb. 19, 2013, 7 pages.
Seo et al., Double-Layer Projection Display System Using Scattering Polarizer Film, Japanese Journal of Applied Physics, vol. 47, No. 3, XP55011651, ISSN: 0021-4922, DOI: 10.1143/JJAP. 47.1602, Mar. 2008, pp. 1602-1605.
U.S. Appl. No. 13/641,676, Final Office Action mailed on Apr. 28, 2014, 9 pages.
U.S. Appl. No. 13/641,676, Notice of Allowance mailed on Jun. 10, 2014, 6 pages.
U.S. Appl. No. 13/806,105, Non Final Office Action mailed Oct. 10, 2014, 11 pages.
Paschotta, Anamorphic Prism Pairs, Encyclopedia of Laser Physics and Technology, Oct. 2008, 2 pages.
Roth et al., 0.2: Wide Gamut, High Brightness Multiple Primaries Single Panel Projection Displays, SID Symposium Digest of Technical Papers, vol. 34, Issue 1, May 1, 2003, pp. 118-121.

\* cited by examiner

| Region 11 | Region 12 | Region 13 | Region 14 |
|---|---|---|---|
| Region 21 | Region 22 | Region 23 | Region 24 |
| Region 31 | Region 32 | Region 33 | Region 34 |
| Region 41 | Region 42 | Region 43 | Region 44 |

Figure 4

HYBRID IMAGE DECOMPOSITION AND PROJECTION

CROSS-REFERENCE TO RELATED APPLICATIONS

This is a U.S. national phase under 35 U.S.C. 371 of International Patent Application No. PCT/IB2012/054133 entitled "Hybrid Image Decomposition and Protection," filed Aug. 14, 2012, which claims benefit of priority under PCT Article 8 of U.S. Provisional Application No. 61/575,117 filed Aug. 16, 2011, each of which is incorporated herein by reference in its entirety.

TECHNICAL FIELD

The present application relates generally to image projection systems and, more particularly (although not necessarily exclusively), to image projections systems that can output image components that are orthogonal or quasi-orthogonal to each other for being superimposed when displayed.

BACKGROUND

A multiple projector system can be used to superimpose images to realize benefits such as higher brightness, a flicker-free image and an image with largely reduced screen door effect. Current multiple projector systems require very accurate inter-projector (i.e. between projectors) image registration to a sub-pixel level to achieve a similar image sharpness that can be realized from a single projector system. Current multiple projection systems that use warping engines to warp one projected image onto another projected image may do so within less than one pixel accuracy. However, image registration accuracy can degrade from system measurement error, optical non-uniformity, thermal drift over time and projector mechanical vibration. The problems can be exacerbated when projecting images are of resolution such as 4096×2160 (4K) or higher, which may need to be superimposed with a finer spatial alignment accuracy.

Another problem that may lead to image degradation in superimposed images can occur when warping one image to match another, which can have a limitation in image quality caused by digital pixel resampling. Image degradation caused by digital image resampling can make the image appear softer, less sharp because of more or less high frequency information loss during the resampling.

When even more projected images are superimposed from projectors in a multi-projection to further increase the dynamic brightness range of the superimposed image, the accuracy of alignment between the projected images can become more challenging. In such systems, the image of the superimposed images may suffer from alignment degradation more easily, and limit the potential to be realized with the increased number of projectors in a multi-projection system, in particular if projected images are from projectors that have a different image projection resolution.

Systems and methods are desirable that can tolerate a greater degree of image alignment error of superimposed projected images yet allow the perceived superimposed image to have the same image quality as if projected from one projector.

SUMMARY

Certain aspects and features relate to outputting image components of an input image for being superimposed, where the image components are orthogonal or quasi-orthogonal to each other.

In one aspect, a method is provided for converting input image data for a hybrid image projection system. The input image data represents an input image. The input image data is divided into at least two image regions based on content of the input image. Parameters for the image regions are determined, where at least one parameter is determined for each of the image regions. A first image component and a second image component are produced by decomposing the input image based on the parameters. The first image component is orthogonal or quasi-orthogonal with the second image component. The first image component is displayed by a first display device. The second image component is displayed by a second display device. The second image component is superimposed on the first image component to produce a final image.

In another aspect, a multiple projector system is provided. The multiple projector system includes an input, a processor, a first system functional module, a second system function module, a first projector, and a second projector. The input can receive input image data representing an image. The processor can process the input image data. The processor can output a first image component and a second image component based on the input image data by dividing the image into image regions based on image content and decomposing the image into the first image component and into the second image component that is orthogonal or quasi-orthogonal to the first image component. The first system function module can modify the first image component. The second system function module can modify the second image component. The first projector can display the modified first image component. The second projector can display the modified second image component superimposed on the modified first image component.

These illustrative aspects and features are mentioned not to limit or define the invention, but to provide examples to aid understanding of the inventive concepts disclosed in this disclosure. Other aspects, advantages, and features of the present invention will become apparent after review of the entire disclosure.

BRIEF DESCRIPTION OF THE DRAWINGS

FIG. 4 illustrates image region sub-divisions for region-based adaptive image decomposition according to certain aspects.

DETAILED DESCRIPTION

Figure 1:
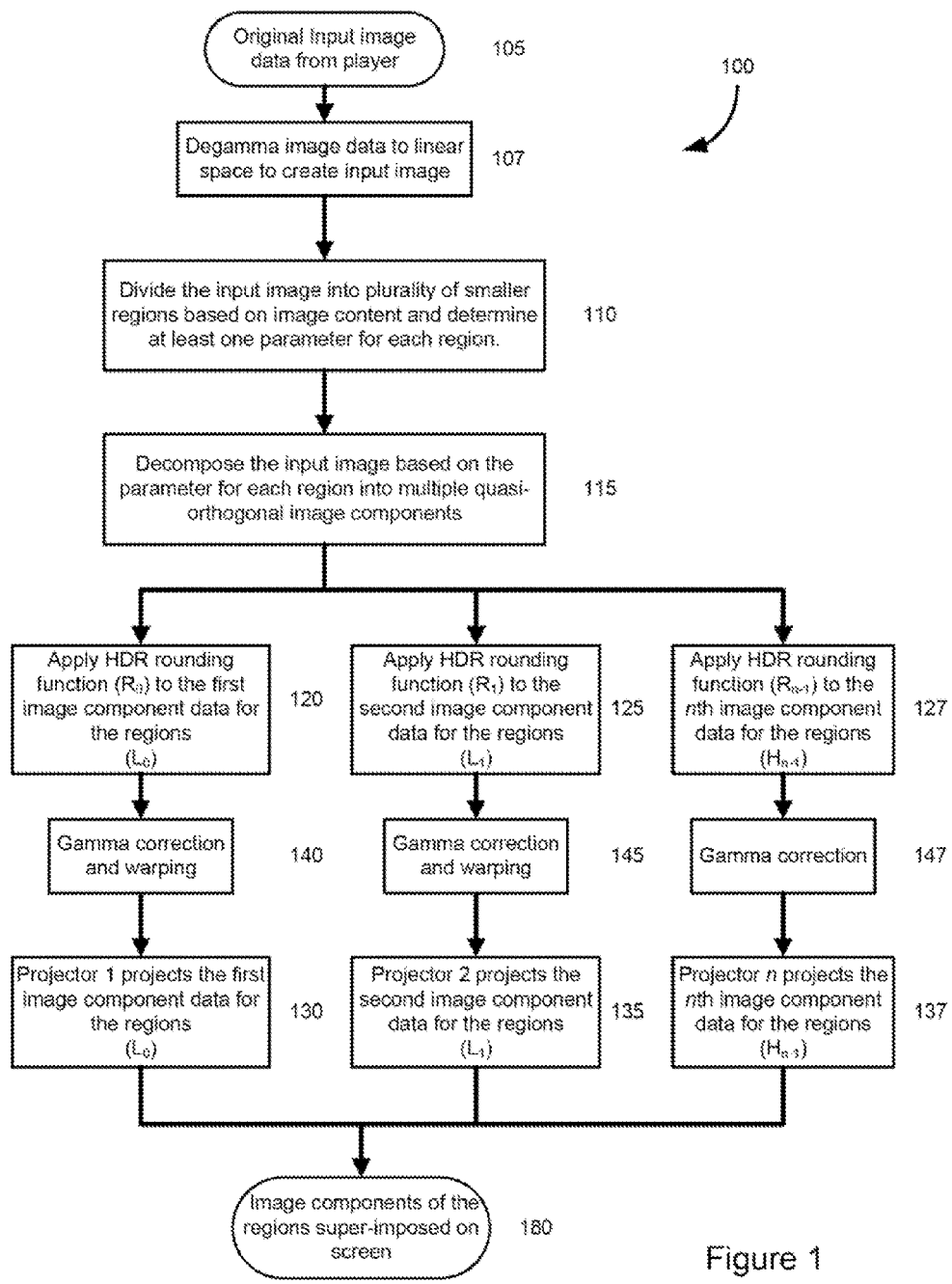
FIG. 1 is a flow diagram of method for a hybrid image projection system according to one aspect.

Certain aspects of the invention relate to hybrid image projection methods and multi-projector systems. Instead of sending a highly correlated identical image to each projector as in a traditional superimposing multi-projector system, a hybrid image projector according to some aspects can divide an input image into smaller regions and determine at least one parameter of each region, then decompose the input image based on the parameter of each region into multiple, less correlated, orthogonal or quasi-orthogonal image components. Each projector can display respective image components so that the images projected may be optically superimposed on a screen. Even though the underlying properties of orthogonal or quasi-orthogonal images may be different than that of original images, when the orthogonal or quasi-orthogonal images are superimposed, the image quality can be substantially the same as when original images are perfectly superimposed or better when superimposed original images are slightly misaligned in a multi-projector system. The superposition of orthogonal or quasi-orthogonal images can result in superposition of images in an existing multi-projector image systems being more insensitive to inter-projector image misalignment. Superimposing orthogonal or quasi-orthogonal images can be used to avoid visible image degradation, and provide more robust image quality in a multiple projector system implementation.

A possibility can arise to increase image fidelity even under a perfect inter-projector alignment condition by applying warping processing to image components with lower spatial frequencies and leaving image components with higher spatial frequencies unwarped. Additionally, the whole system image intensity resolution, (sometimes referred to as digital dynamic range for each color) can be increased by at least a factor of the total number of projectors. Increasing image intensity resolution can reduce color banding artifacts, also known as color contouring artifacts. Color banding artifacts can occur when step changes in color and/or brightness are visible as a result of low color or brightness resolution. Banding artifacts can be significant when very high contrast and high brightness projectors are used. Systems and methods according to some aspects can provide the flexibility to mix heterogeneous projectors, such as projectors with different image quality performance characteristics (e.g. different spatial resolution, or brightness lumens, or contrast). In a stereoscopic dual projector system, hybrid image projection can also decouple the lighting control of running the system at different light source power levels for 2D and three-dimensional (3D) display. With a hybrid image projection system, flexibility to adjust 3D light levels to better meet brightness demands for 3D presentations independent of the optimum setting for a 2D presentation can be realized. For the 2D presentation, the hybrid image projection method can improve the robustness of image quality displayed when superimposed images are displayed by multiple projectors and there is spatial misalignment between the superimposed images. For example, a dual projection system that uses hybrid image projection methods according to certain aspects may display a better quality image, or at least display an image quality that is the same as a dual projection system that displays two of the same images superimposed. Hybrid image projection methods and systems to display a superimposed image may avoid producing an image quality that is worse than the traditional projection that superimposes the same images. Using hybrid image projection methods in a multiple projection display system can be a low risk solution to improving image quality. Hybrid image projection can enable a multiple projection system to combine benefits from both a multiple projection and a single projection systems, while avoiding the shortcomings of both. For example, a hybrid image projection system can create a superimposed image where image sharpness is similar to that of an image projected by a single projector but there can be increased image brightness and reduced image screen door artifacts.

These illustrative examples are given to introduce the reader to the general subject matter discussed here and are not intended to limit the scope of any claim. The following sections describe various additional aspects and examples with reference to the drawings.

FIG. 1 shows a block diagram of a method for a hybrid image projection system according to one aspect. A hybrid image projection system may be a projection system that includes more than one projector. Each projector can be the same type or each can be a different type. For a multiple projector display system with n projectors, the n projectors can display an image and contribute to the final image on the screen. The n images can be superimposed for boosting image brightness. In a traditional dual-digital projection system, each projector is the same type, displays the same image and requires a calibration process to accurately align the images. The calibration process is repeated periodically to maintain optimal image display performance. After the projection system has been optimally calibrated, the digital resampling carried out in the warping operation can introduce a loss of image detail in the final image displayed on the screen. If more projectors are used, the loss of image detail may increase. Several factors may cause spatial alignment between the superimposed images to change over time. Such factors can include thermal variations and mechanical vibration. Hybrid image projection methods according to some aspects can help reduce the effects of change to image quality by computing with a processor a different set of image components that each projector can display for a superimposed image.

If two images being superimposed are highly similar and have correlated image information in spatial domain or in frequency domain, representation may be highly non-zero and overlapped due to their non-orthogonality, and can result in there being a large overlap of information components from one image space to another. A slight shift from spatial alignment may cause great spatial distortion and spurious frequency components in the final superimposed image displayed. This overlap of information leading to spatial distortion can be explained in terms of the Fourier transform theorem.

In a linear system, if two images are superimposed in spatial domain, the images are also superimposed in the frequency domain. Fourier transform theorem can indicate that a shift in spatial domain can translate a phase shifting term multiplicative to a signal's Fourier transform in frequency domain. This can add distortion to the final superimposed signal (i.e. image) if two signals are non-trivially overlapping in their Fourier Transforms. To make a system insensitive or substantially insensitive to the shifting, two signals can have minimized frequency overlapping. For example, if two signals (i.e. image components) are orthogonal to each other, the spatial registration accuracy can have minimal effect to the final superimposed signal. If they are quasi-orthogonal, the sensitivity to the spatial relative shifting can be reduced.

If two image signals are normalized, and the spatial 2D convolution of two image signals (also referred to mathematically as the inner production or dot product) is close to a constant or 0, then these two image signals can be called mutually orthogonal or quasi-orthogonal. The orthogonal relationship can also be expressed when the multiplication of two Fourier transforms is close to a delta function that is zero everywhere except at frequency zero. Two orthogonal or quasi-orthogonal images may normally show less similarity in spatial domain and less disjointness in frequency domain.

Assuming two images are f and g, the Fourier transforms of each image are F and G, respectively. The orthogonality measure can be $(f*g)(x)=\iint f(y)g(x-y)dy=c$ or $F \cdot G = c\delta(\omega)$. Image data can be computer generated or captured with image sensors such as in a camera. Image data that is generated by a computer can be generated so that when hybrid image projection methods according to some aspects are applied to the computer-generated image data, ideal orthogonal image components can be computed to be displayed. In some situations image data is not such that it is possible to generate ideal orthogonal image components and it may be possible to generate quasi-orthogonal image components by having $(f*g)(x) \approx c$ or $F \cdot G \approx c\delta(\omega)$. For superimposing a pair of quasi-orthogonal images, the image quality sensitivity to the spatial shifting can be greatly reduced. The measure of orthogonality can be applied to exceptional cases when one of two signals is not properly normalized in the 0 to 1 range. In this case, the above orthogonality measure can still be used to evaluate the shifting insensitivity.

For example, one image F contains only low frequency information (i.e., it does not have any information above a threshold frequency $\omega_T$) and there is another ideal image G that contains only high frequency information such that it does not have any information below $\omega_T$. Because the dot product of the two images $F \cdot G=0$, F and G are orthogonal images. The spatial relative shifting between the two superimposed orthogonal images can have minimal effect to the final displayed image quality. As long as $F \cdot G$ is small (therefore quasi-orthogonal), the low frequency image and high frequency image may be insensitive to a small registration error in superposition. However, it may be difficult to obtain two image components in which one has only frequency components above $\omega_T$ and one that has frequency components below $\omega_T$.

In another example, image information below a threshold frequency $\omega_T$ is referred to a low frequency info and image info above $\omega_T$ is referred to as high frequency information. F is a band passed image that contains only intermediate frequency components between a lower and upper threshold frequency ($\omega_{T1}$ to $\omega_{T2}$) where $\omega_T$ is between $\omega_{T1}$ and $\omega_{T2}$ and another image G contains frequencies outside of those covered by image F, including the frequencies below the lower frequency threshold $\omega_{T1}$ and the high frequencies above the higher frequency threshold $\omega_{T2}$. In this case, both F and G contain a certain portion of low frequency information and a certain portion of high frequency information. By adjusting thresholding frequencies $\omega_{T1}$ and $\omega_{T2}$, F and G can have any combination of low and high frequency energy. Neither F nor G can have significantly low frequency information or high frequency information. With this exemplary image signal pair, because $F \cdot G$ is also small, the sensitivity to the alignment error between the two superimposed image components can be low due to quasi-orthogonality.

In another example, image F is a normal image and image G is not normalized but has very small magnitude. Because $F \cdot G$ is small, the sensitivity to the alignment error between the two superimposed image components can be reduced.

In another example, two images F and G both contain only low frequency information (i.e., the images do not have any information above the same or different threshold frequency). Depending on how low the threshold frequency is, $F \cdot G$ may be small except for frequencies very close to zero—similar to a delta function. Because of this quasi-orthogonality, the sensitivity to the alignment error between the two superimposed image components can be low.

In another example, two images F and G both contain certain amount low frequency information (i.e. the images have information below the same or different threshold frequency). One image also has high frequency information. In this case, $F \cdot G$ may be small except for frequencies very close to zero—much like a delta function. Because of this quasi-orthogonality, the sensitivity to the alignment error between these two superimposed image components can be low.

In another example, two images F and G both contain only high frequency information (i.e., the images do not have any information below a same or different threshold frequency). Depending on how low the threshold frequency is, $F \cdot G$ can be small around low frequencies and large at higher frequencies. The images can be less orthogonal to each other and the sensitivity to the alignment error between the two superimposed image components can be high.

In another example, one image F contains normal frequency information ranging from low to high and another image G is a normalized white noise image (i.e., G is constant). $F \cdot G$ can be proportional to F and may not be close to a delta function. The images are less orthogonal to each other such that the sensitivity to the alignment error between the two superimposed image components can also be high.

In a hybrid image projector according to some aspects, a processor can decompose an input image into n quasi-orthogonal image signals for an n-projector projection system. The n signals can be almost orthogonal to each other such that a slight shift in spatial alignment between the superimposed quasi-orthogonal images may not cause large perceived image quality degradation. The resultant image of the superimposed images can be of the same or better in image quality than two original images superimposed by a dual projection system and the resultant image can be brighter than an original image displayed from a single projector. The image decomposition algorithms used in a hybrid projector may be mathematically accurate and provide a constraint that results in the image component values being non-negative and within the brightness range capability of each display or projector.

In FIG. 1, original input image data (105) for 2D display is transmitted from image playing server to a multiple projector display system that can implement hybrid image projection methods according to some aspects. The input image may be gamma correct and can be considered to be in gamma corrected space. The gamma corrected image can be gamma decoded into linear color space (107) for subsequent steps and algorithms. After the image data has been converted to linear space, an image analysis algorithm can be used to determine how the image can be divided into multiple image regions based on the image local content (110). Image regions can be of the same size or different sizes. For example, in one aspect, 3-by-3 image pixel square regions can be used to divide an image into a regular grid of blocks, resulting in each image region having the same size. In another aspect, a region decomposition algorithm can be used to divide the image into an irregular grid of blocks, such as a quad-tree structure, in which smaller regions can show up in heavy textured image areas and sparse, bigger regions can appear in relatively smoothed image areas. Image region-based processing can help in adjusting parameters of image decomposition filters to adapt to the local image content. For example, if a spatial low pass filter is used in the image decomposition algorithms, the choice of cutoff frequency of this low pass filter can be proportional to the local image content frequency distribution, resulting in an optimally balanced local frequency separation, which may be useful to reduce the outlier pixels for artifacts. Outlier pixels may be pixels that have significantly different values relative to other image pixels. Smaller regions can allow the local high frequency features to be followed better, while larger regions can be suitable for sparse features and relatively smoothed areas. Dividing an image into regions based on image content may provide the optimal adaptation to local image content for the image decomposition algorithm (115) and decompose the signal into minimal correlated and balanced image components, or called quasi-orthogonal components. The region-based image quasi-orthogonal component decomposition can help reduce the number of possible fallback pixels and improve the overall image quality. Fallback pixels may be those pixels containing high frequency image information and that are supposed to be in one of the image components, but have values that exceed a normalized maximum threshold (a constraint of a display device). For fallback pixels, the amount of value exceeding the maximum threshold can fall back to the other image components which are not saturated against the maximum threshold. Fallback pixels can be a source of artifacts in the projected image components under misalignment and the source of color artifacts if projectors are not uniform in brightness, color and pixel size. Pixels identified as fallback pixels can be modified to prevent pixel artifacts from appearing in the displayed superimposed images.

Block (115) may be useful for image decomposition. Image decomposition can include adaptive image decomposition into multiple quasi-orthogonal image components that can be displayed by each projector. As described earlier, there can be several methods and ways to construct a set of quasi-orthogonal image components. In one aspect, a Modified Empirical Mode Decomposition (MEMD) method can be used. Numerous other methods, however, can also be applied in a similar way to achieve the quasi-orthogonality decomposition.

In an n projector system, after MEMD image decomposition, the first image component $L_0$ can contain the input image information with combination of low frequency band and high frequency fallback pixels. The other image components containing different levels of detail information in different frequency bands can be identified as $L_1$, $L_2$, to $H_{n-1}$. Identification of the other image components and a hierarchy of image components according to one aspect is described below in more detail with respect to FIG. 2. Each image component can include a different spatial frequency component resulting from a local adaptive filter process applied to the input image within image regions. One method of the image decomposition algorithms is described below in more detail with respect to FIG. 3.

After the input image is decomposed into multiple separate decomposed image components, each can be provided to separate projectors (130, 135, 137), via a separate additional image processing path, for displaying on a screen. Each of the additional image processing paths (120, 125, 127 and 140, 145, 147 and 130, 135, 137) can process the separate decomposed image components in a similar way. Each of the decomposed image components can be processed first by a High Dynamic Range (HDR) rounding function R at blocks (120, 125, 127) within each image region to improve the brightness dynamic range representation capability or color resolution of the whole hybrid image projector system. Decomposed image components subsequent to the HDR rounding function can be modified by a pixel-based geometric warping process for inter-projector registration, and with gamma correction for displaying. Each member projector can receive and display each processed and corrected image component in blocks 130, 135 and 137. Block 180 represents the resulting improved image when the image components are projected and optically superimposed on a screen.

In one aspect, blocks 107, 110, 115, 120, 125 and 127 can be implemented in an image processing device or image enhancer hardware. Blocks 130, 135, 137 represent the image processing inside each projector to display an image on a screen to produce a resultant image (180).

Figure 2:
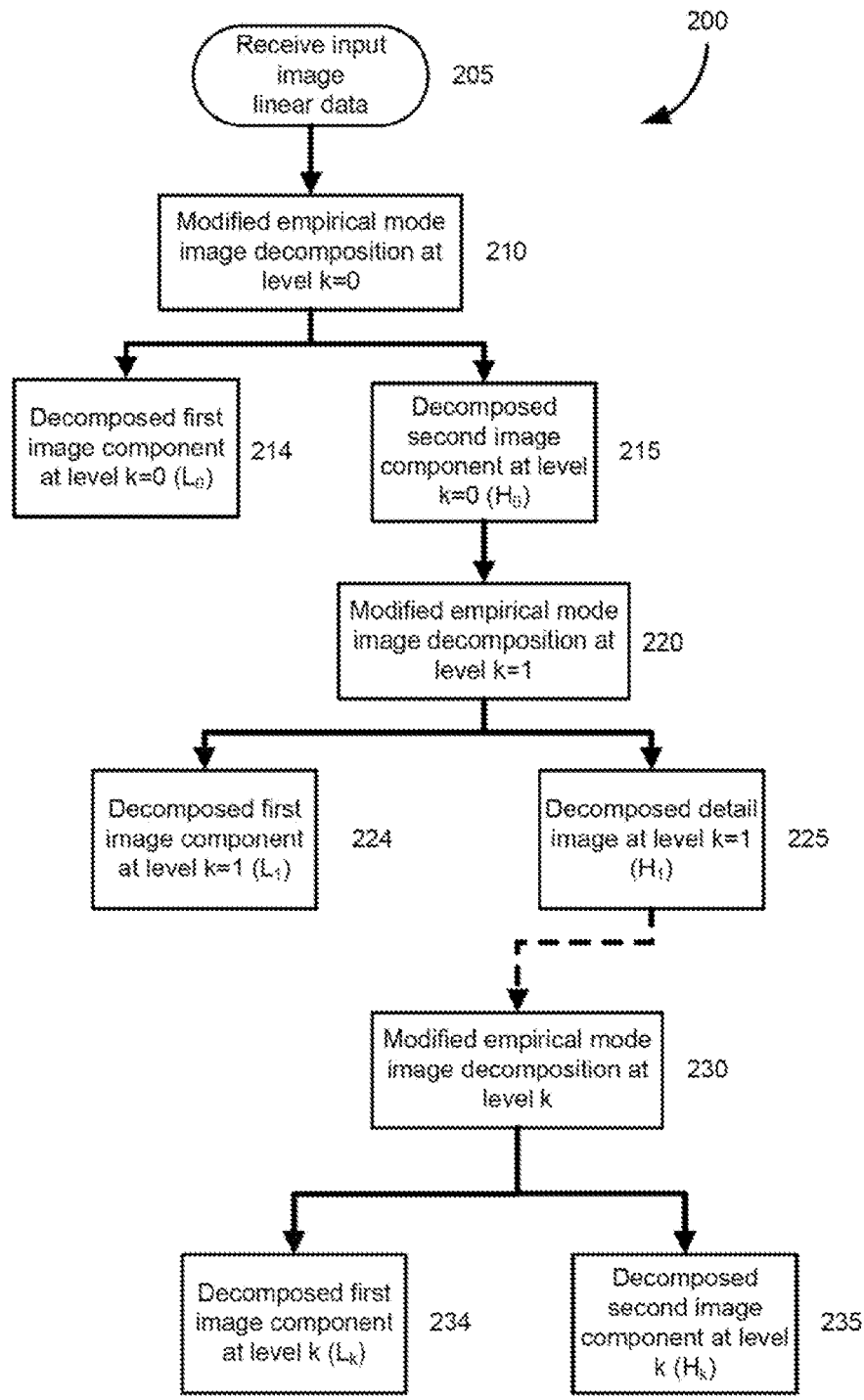
FIG. 2 is a flow diagram of a multiple level structure and hierarchy of an image decomposition process according to one aspect.

FIG. 2 illustrates a multiple level structure and hierarchy of the image decomposition process of block 115 in FIG. 1 according to one aspect. The image decomposition core algorithm can be an MEMD decomposition algorithm. The MEMD decomposition algorithm can decompose images in multiple levels. Each level of decomposition can divide the input image (also referred to as Intrinsic Mode Function (IMF)) into two image components—one current level, minima mode image and the other one the next level IMF image. For projection system applications, received input image data (205) can be in linear space. For a dual projector system, one level of MEMD decomposition is needed (210). Assuming k represents the decomposition level, then k=0. The first image component is $L_0$ (214), the second image component is $H_0$ (215). For projector system that has more than two projectors, the MEMD can continue to the next level k=1 of decomposition (220) to produce the next level first image component $L_1$ (224) and the second level second image component $H_1$ (225). At this level of MEMD, the previous level second image component $H_0$ becomes IMF of current level. At level k=1, three decomposed image components are outputted, which are image component $L_0$ (214), $L_1$ (224) and image component $H_1$ (225). Two levels of MEMD can be used for a three projector hybrid image projection system. If four or more projectors are used, the third level or more of MEMD can be used to generate new image components (230). At level k=2, the image component $H_1$ (225) can become the new IMF for the next level (level k=3) of decomposition until the image components are generated for each projector. For an n-projector hybrid projection system, n minus 1 levels of MEMD image decomposition can be used to generate n decomposed images, which are $L_0$ (214), $L_1$ (224), $L_2$, ... $L_{n-1}$ (234) and $H_{n-1}$ (235). Multiple levels of MEMD can form a binary tree-like decomposition hierarchy with each intermediate level generating an outputting node image $L_k$, except for the last level the IMF detail image $H_k$, which can be an outputted node image.

Figure 3:
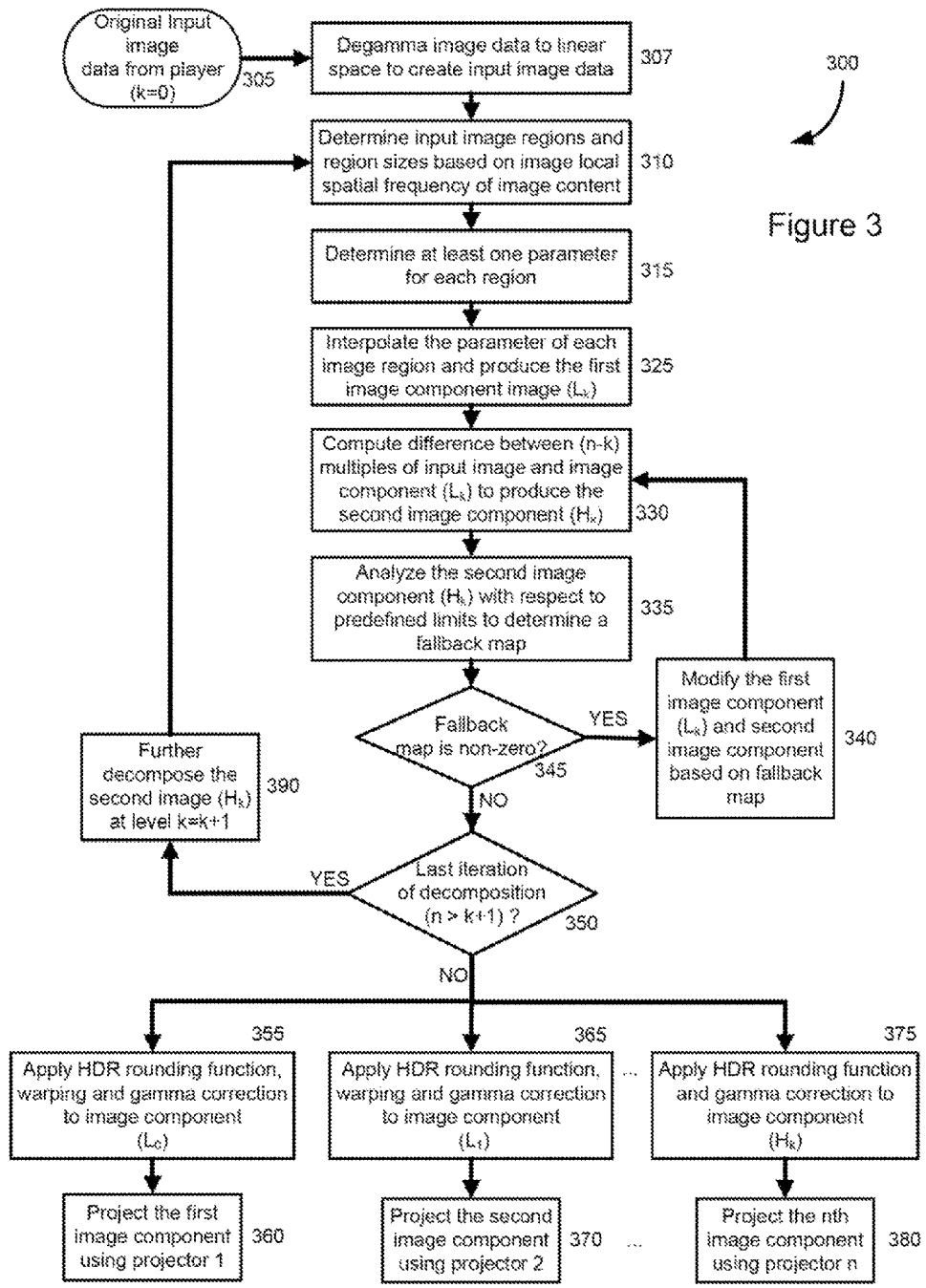
FIG. 3 is a flow diagram of image processing steps of a hybrid image projection system using modified empirical mode image decomposition (MEMD) according to one aspect.

FIG. 3 illustrates image processing steps of the hybrid image projection using modified empirical mode image decomposition (MEMD) for an n-projector system. Assuming input image data from a playing server is in gamma corrected space and initially MEMD is at the first level k=0 (305), the images can be first gamma decoded and converted into linear space image X (307).

After the image data is converted to linear space, the image within each region can be decomposed into two image components at current level k. Assuming the linear space image is X, two image components are L and H respectively, and the final superimposed image is 2X, the desired image decomposition method can satisfy the following:

1) Orthogonality or Quasi-orthogonality:Fourier transforms of components satisfy or substantially satisfy $F(L) \cdot F(H) = \delta(\omega)$;

2) Image fidelity and completeness with respect to original image: for any image pixel location p, $L_{(p)}+H_{(p)}=2X_{(p)}$;
3) Non-negative constraint: $L_{(p)}, H_{(p)} >= 0$;
4) Brightness practical limit: $L_{(p)}, H_{(p)} <= 1$;
5) Local adaptivity: decomposition optimally adapts to local image properties; and
6) Brightness balancing control: mean(L)=α·mean(H), where "mean( )" represents average brightness of an image component; α is the desired ratio that will be predefined and is greater than zero.

In one aspect, a hybrid projection system can use spatial domain MEMD decomposition method for decomposing the image into two image components (L and H). In some implementations, the following steps can be used:
1) For a given input 2D image X, determine an optimal way to divide it into spatial regions.
2) Within each predefined spatial region, determine the local minima value of the input image X and its location;
3) Determine a balancing factor b and modify each local minima value by multiplying them with b.
4) Interpolate the modified local minima values into a low frequency surface as the first image component L such that no value of superimposed image 2X is smaller than the value of the first image component L (i.e. L=min(L, 2X)).
5) Subtract the value of image component L from the value of superimposed image 2X to obtain the value of the second image component H (i.e. H=2X−L), which may be quasi-orthogonal to image component L because $F(L)F(H)<F(X)^2$, where "F( )" represents a Fourier transform operation.
6) Detect component values when the value of image component H is more than T, (where T is a maximum possible value of X) and the excessive value in image component H falls back to the value of image component L (i.e. when L=L+max(H−T,0)). Situations where image component H is more than T may be rare.

The following description is based on the above hybrid projection with MEMD decomposition. An image analysis algorithm using a predefined function can be used to determine how the image can be divided optimally into multiple image regions based on the image local content (310). The image regions can be the same size or different sizes. For example, in one aspects a square 3-by-3 pixel region can be used to divide up an image into a regular grid of blocks, resulting each block image region having the exactly same size. In another aspect, a quadtree structure-like region decomposition algorithm can be used to divide image into an irregular grid of blocks, where several smaller block regions can appear in heavy textured image areas and bigger block regions can appear in relatively smoothed image areas.

After the image regions are determined, at least one parameter for each region, for example the 2D local minima values and the locations of those minima values, can be identified within each region or block region (315). If the image is a color image, then the minima can be determined for each color component (e.g. RGB, XYZ) that is included in the color image. The minima and their locations can be defined as a value equal to the smallest value within their image block region. These values may be referred to as 2D local minima and their locations may be referred to as local minima locations. The result can be a 2D irregular mesh grid $M_k$ with a known local minima value for each block region and a value location in the block region where other locations in the block region have undefined values. This mesh grid can be used to generate a continuous smooth lower bounding surface of the input 2D image X and can be an initial estimation of the first image component $L_k$ for a decomposition level k.

In the block 320, a brightness balancing factor $b_k$ can be determined. The brightness balancing factor $b_k$ can be used to control automatically the balancing of the average image brightness of the two decomposed image component L and H at each MEMD level k. Each level of MEMD can have its own independent brightness balancing factor. In one aspect of a dual projector system, the average image brightness between two decomposed image components L and H can be same or very close to each other. Balancing image brightness of left and right projectors can minimize thermal drift between left and right projectors, which can minimize image registration or alignment error and allow the warping to work as effectively as when the system was last calibrated. Another benefit that may be realized is that a balanced thermal drift between left and right images can minimize the registration degradation in a dual projector setup. Unbalanced thermal drift between left and right projectors may result in unpredictable misalignment degradation. The brightness balancing factor for decomposition level k can be calculated for each image color i as follows:

$$b_{k,i} = \begin{cases} \min\left(\frac{\text{mean}(M_{k,i})}{\text{mean}(X_{k,i})}, \tau\right), & \text{mean}(X) > 0 \\ 1, & \text{other} \end{cases} \quad (1)$$

$M_k$, is the irregular mesh grid of 2D local minima of image channel i at level k calculated in the previous block (315). $X_{k,i}$ is the—input i channel image values at level k. For example, $b_{ki}=1$ means the average brightness of L and H image component value are the same. τ is a predefined threshold or limit of the final brightness balancing factor $b_{ki}$. When mean(X) is a very small number, the brightness balancing factor can be large and may be limited to the value of τ. This may be useful to minimize possible undesirable brightness artifacts.

After brightness balancing factor $b_k$ is determined, the 2D local minima mesh grid $M_k$ can be multiplied with $b_k$ to obtain modified 2D local minima mesh grid $M_k'$ (i.e. $M_k'=b_k \cdot M_k$) (315). The output data of block 315 can be used to generate a continuous smooth lower bounding surface of the input 2D image X, which can be a first image component $L_k$ for a decomposition level k.

In block 325, the interpolation from $M_k'$ to $L_k$ can be performed by using a linear or non-linear method. Examples of a linear interpolator and a non-linear interpolator are described below, but interpolation is not limited to the example algorithms—any linear and non-linear scattered data interpolation algorithms can be used.

In one aspect, a fast linear interpolator can be used to smoothly interpolate the modified 2D local minima mesh grid $M_k'$ to a smoothed surface $L_k$. This interpolator is a linear triangular interpolator. For every non-minima, value undefined pixel within $M_k'$, the nearest three known neighbor pixels $P_1$, $P_2$ and $P_3$ are determined. The three neighbor pixels $P_1$, $P_2$ and $P_3$ can form a triangle. The unknown pixel v and its neighbor pixels have values and coordinates v(x,y), $v_1(x_1,y_1)$, $v_2(x_2,y_2)$ and $v_3(x_3,y_3)$, such that:

$$\begin{cases} v_1 = ax_1 + by_1 + c \\ v_2 = ax_2 + by_2 + c \\ v_3 = ax_3 + by_3 + c \\ v = ax + by + c \end{cases} \quad (2)$$

The above linear system can be solved to find value v; a, b, c are variables.

In another aspect, a Clough-Tocher method (i.e. cubic triangular interpolator such as explained in Isaac Amidror, "Scattered data interpolation methods for electronic imaging systems: a survey," Journal of Electronic Imaging, April 2002) can be used. The same triangle neighbor pixels around interpolating pixel can be found, and the original triangular $P_1$, $P_2$ and $P_3$ can be further split into mini Bezier patches. $v_1, v_2, v_3$ can be three values of the three vertexes of $P_1$, $P_2$ and $P_3$, respectively. $b_{3,0,0}, b_{0,3,0}, b_{0,0,3}$ can be barycentric coordinates of $P_1$, $P_2$ and $P_3$. $b_{1,1,1}$ can be the barycentric coordinates of the interpolation pixel. $b_{1,2,0}, b_{2,1,0}$ can be barycentric coordinates of two control points located on triangular side $P_1P_2$. $b_{0,2,1}, b_{0,1,2}$ can be barycentric coordinates of two control points located on triangular side $P_2P_3$. $b_{1,0,2}, b_{2,0,1}$ can be barycentric coordinates of two control points located on triangular side $P_2P_3$. The locations of control points can be determined by cross-boundary derivatives constraints at $P_1$, $P_2$ and $P_3$. The interpolated value v at location $b_{1,1,1}$ can be calculated using the following:

$$v(v_1,v_2,v_3)=b_{3,0,0}v_1^3+3b_{2,1,0}v_1^2v_2+3b_{1,2,0}v_1v_2^2+ \\ b_{0,3,0}v_2^3+3b_{0,2,1}v_2^2v_3+3b_{0,1,2}v_2v_3^2+b_{0,0,3}v_3^3+ \\ 3b_{1,0,2}v_1v_3^2+3b_{2,0,1}v_1^2v_3+6b_{1,1,1}v_1v_2v_3 \quad (3)$$

In another aspect, a non-linear interpolation can also be used. An example of a non-linear interpolator is an irregular bilinear interpolator. For every non-minima, value undefined pixel within $M_k'$, the nearest four known neighbor pixels $P_1$, $P_2$, $P_3$ and $P_4$ can be determined. The four neighbor pixels $P_1$, $P_2$, $P_3$ and $P_4$ can form a bounding quadlateral. The unknown pixel v and the neighbor pixels $P_1$, $P_2$, $P_3$ and $P_4$ can have values and coordinates v(x,y), $v_1(x_1,y_1)$, $v_2(x_2,y_2)$, $v_3(x_3,y_3)$ and $v_4(x_4,y_4)$. "A" can be a point on side $P_1P_3$ when vertical coordinate equals to y. "B" can be the point on side $P_1P_2$ when horizontal coordinate equals to x. "t" can be the distance from $P_1$ to A and "s" can be the distance from $P_1$ to B. The value of P can be determined by:

$$v=v_1(1-s)(1-t)+v_2s(1-t)+v_3(1-s)t+v_4st \quad (4)$$

Further, the values of s and t can be calculated by linear interpolating on any side of pixel pairs. In situations where one or more pairs of quadlateral sides are parallel, a different and simpler formula than (4) can be used.

In another aspect, a non-linear and fast interpolation method can be used to achieve simplicity for real time speed and good image quality. The method can be Recursive back-Injection interpolation by Multi-kernel Gaussian (RIMG).

Once $M_k'$, the modified 2D local minima mesh grid at level k, is calculated from the previous block (315), an initial estimation of the interpolation surface $L_k$ can be fast calculated by a nearest neighbor interpolator in block 325. For example, undefined pixel values in $M_k'$ can be filled with the nearest neighbor values (i.e. the minimum values of the image region to which they belong). The estimated surface $M_k^0$ can be a starting point (j=0) of the following recursive algorithm (RIMG). The resulting image can be filtered by a first standard 2D Gaussian filter with a first larger kernel size and a first larger sigma value. The filtered image may be a blurred image. The pixel values within this blurred image may not be less than input image X. The resulting image $M_k^j$ can be updated by injecting back the original minima values using the following where j is the index of recursive:

$$M_k^j = G_j(\min(M_k^{j-1}, M_k^0)), j=0,1,\ldots,w-1$$

G(*) is Gaussian filtering. w is total number of iteration. After the final iteration, $L_k = \min(M_k^{w-1}, (n-k)X)$ is the first image component.

After obtaining the smoothly interpolated lower boundary surface at decomposing level k in block 325 as the first image component $L_k$, the second image component $H_k$ can be estimated in block 330 by calculating the difference between the desired superimposed image (n−k)X and image component $L_k$ as $H_k=(n-k)X-L_k$. Because $L_k$ is the local minima, $H_k$ can be positive, which can satisfy the non-negative constraint. In block (335), the second image component $H_k$ can be analyzed to check it with the brightness limit constraint (i.e. the image component $H_k$ may not be bigger than a brightness that one projector can produce). Assuming T is the maximum possible value of X of single projector, and $\Delta=\max(H_k-(n-k-1)T,0)$, then Δ can be the fallback map, which can be zero. In block (345), the fallback map can be checked to determine whether it is zero. If it has at least one non-zero value, pixel fallback in the current image decomposition can be used to ensure the accuracy and completeness property (i.e. image fidelity and completeness). The fallback map Δ can be used together with the input image to modify the previously calculated first image component $L_k$ and second image component in block (340). The first image component $L_k$ can become $L_k=L_k+\Delta$. The result can return to block (330) for another iteration in computing the second image component $H_k$ with the newly updated first image component $L_k$. The computation in block (335) and fallback map checking in block (345) can be repeated. The loop can continue until the fallback map in block (345) is zero. Then, at block (350), there is a check if the image components are already decomposed. If not, the process can return to block (310) to continue a next level decomposition algorithm with k=k+1 and the current level second image component $H_k$ can become the input image to be further decomposed in block (390).

After the last iteration of image decomposition in block (350) is complete, image components can be provided to blocks (355, 365, 375) respectively for HDR treatment, image warping for spatial registration and gamma correction for display. The processed image component data $L_0$, $L_1$, ..., $H_k$ can be provided to blocks (360, 370 and 380) respectively for each projector to display on the screen.

The HDR treatment in blocks (355, 365 and 375) can realize the increased digital dynamic range in an n-projector hybrid projection system. By applying a HDR rounding function to each image component, the final combined image can gain the improved one more bit accuracy, assuming the input image to HDR rounding function has enough precision in pixel values and each projector uses 12-bit unsigned integer data. In some aspects, the projectors can be assumed to produce the same brightness. In other aspects, different HDR rounding functions can be similarly derived when each projector produces different brightness. The HDR rounding function may be a set of rounding functions to properly treat and round each image component high precision pixel data to 12-bit projector integers, such that the final superposed image can have pixel value resolution of about $12+\log_2 n$ bits. For example, a dual projector system can deliver a 13-bit digital dynamic range. A three-projector system can deliver a 13.585-bit digital dynamic range.

In a dual projector system, a high precision pixel value for the first projector can be XL and for the second projector can be XR. An HDR rounding function set can be designed to round off the value of the two image components into two 12-bit unsigned integers of first image component L and second image component H so that the final L+H can be at thirteen bit accuracy. To achieve the accuracy the HDR rounding functions for thirteen bits can be as follows:

1) for projector 1, L=floor(XL+XR−floor(XR)+0.25)
2) for projector 2, R=floor(XR+XL−floor(XL)+0.75)

Similarly for an n-projector system, the high precision pixel values can be X, i=0, 1, 2, . . . , n−1 and the 12-bit image data in each projector can be $P_0, P_1, P_{n-1}$. The HDR rounding functions for $(12+\log_2 n)$ bits can be:

$$\text{for projector } i, P_i = \text{floor}\left(\sum_{j=0}^{n-1} X_j - \sum_{m=0,m\neq i}^{n-1} \text{floor}(X_m) + \frac{2i+1}{2n}\right)$$

Two examples of image region sub-division methods and arrangements for region-based adaptive image decomposition according to one aspect are illustrated in FIG. 4. A fixed region window size is used to divide the image into a regular grid of smaller regions, for example regions 11, 12, 13, 14, 21, 22, 23, . . . and 44. In another aspect, a tree-like structure region decomposition algorithm can be used to divide the image into various sizes of regions that forms an irregular grid, where several of smaller regions (e.g. regions 1, 2, 4, 5) can appear in heavy textured image areas and larger regions (e.g. regions 0, 3, 6) can appear in relatively smoothed image areas.

Image region-based adaptive processing can help adjust parameters of image decomposition filters to adapt to the local image content. For example, if a spatial low pass filter is used in one example of image decomposition algorithms, the choice of the equivalent cutoff frequency of this low pass filter can be proportional to the local image content frequency distribution, resulting in an optimally balanced local frequency separation that can reduce the outlier pixels for artifacts. Smaller regions can allow for following the local high frequency features, while larger regions can be suitable for sparse features and smoothed areas. Dividing the image into the same or different sized regions based on image content can provide the optimal adaptation to local image content for the image decomposition algorithm and decompose the input image into minimally correlated image components (i.e. quasi-orthogonal components). The region-based image quasi-orthogonal component decomposition can help to reduce the number of possible fallback pixels and improve the overall image quality since the fallback pixels can be a source of artifacts under projector misalignment and a source of color artifacts if projectors are not uniform in brightness, color and pixel size.

Figure 5:
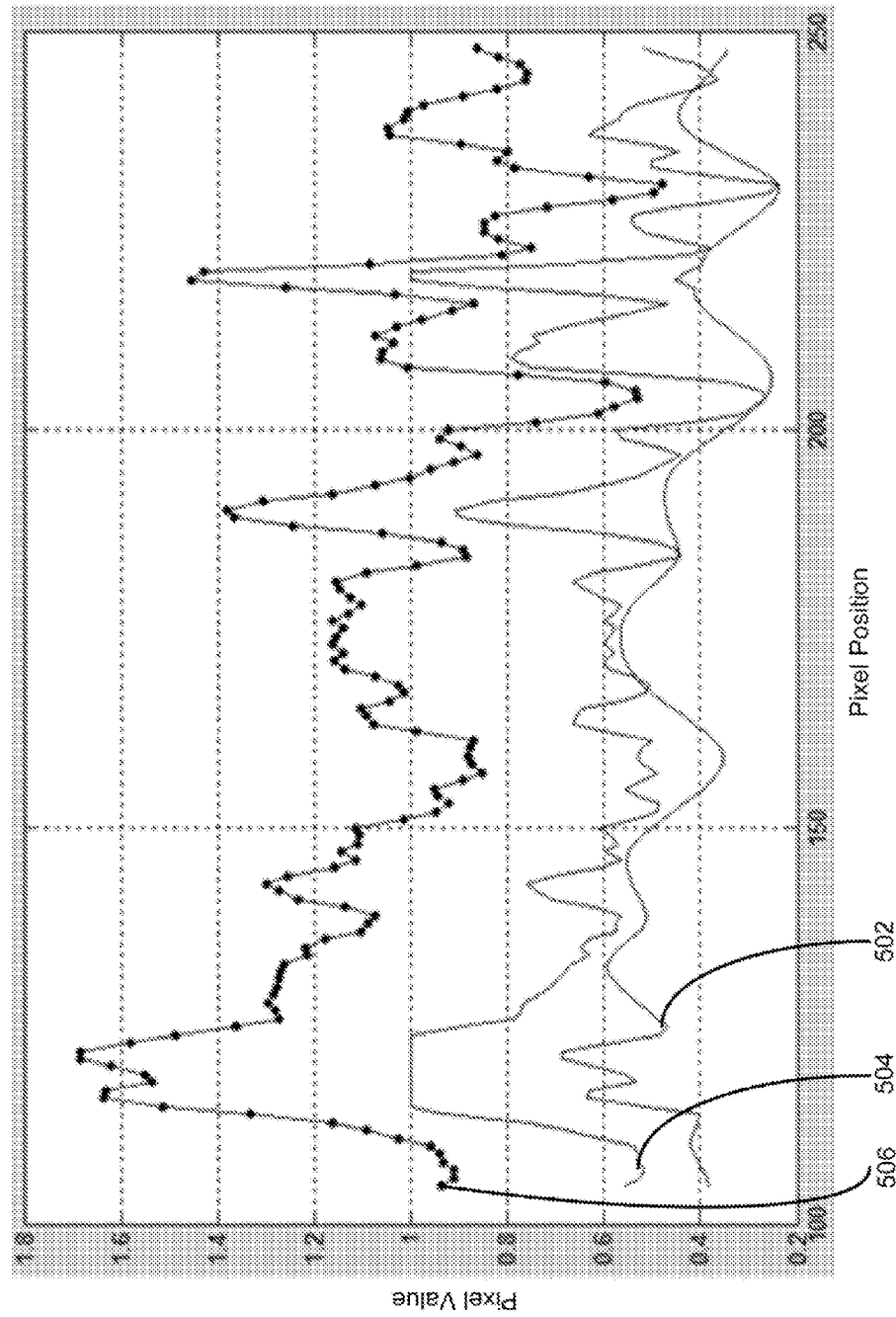
FIG. 5 is a chart of a one-dimensional (1D) cross-section example of a MEMD method according to one aspect.

FIG. 5 illustrates a one dimensional (1D) cross-section example of the image decomposition method MEMD. Line 502 can represent the first image component with fallbacks at about 120 and 220. Line 504 can be the second image component that is quasi-orthogonal to the first image component. The first and second image component lines 502, 504 can add up to reconstruct the original signal, represented by line 506 with sampling dots. The image pixel values can be in the same scale and within the normalized range from 0 to 1.

Figure 6:
FIG. 6 is a two-dimensional (2D) example picture illustrating image decomposition from a MEMD method according to one aspect.

An example of image decomposition from the MEMD is depicted in FIG. 6. The left side is the decomposed first image component and the right side is the decomposed second image component, which contains more high frequency information.

Figure 7:
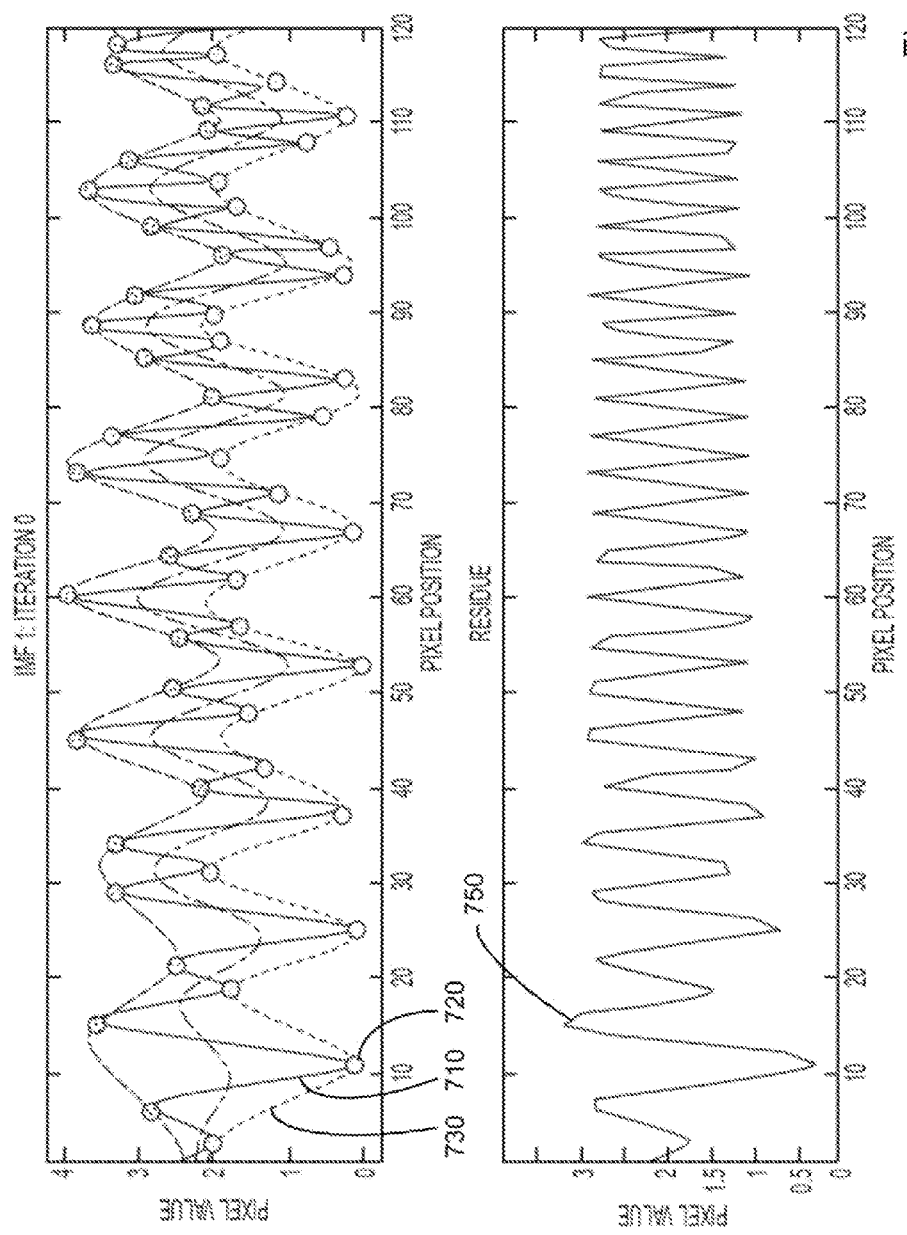
FIG. 7 depicts charts of a 1D example of image decomposition at one level using MEMD according to one aspect.

FIG. 7 illustrates a 1D example of one level of image decomposition of the MEMD. The vertical axis represents the pixel value and the horizontal axis represents the pixel position. The input image signal is curve 710. In iteration 0, the local minima values 720 of intrinsic mode function 1 (710) are located and smoothly interpolated into a surface 730. The residue curve (750) shown in the lower part of FIG. 7 is the result from subtracting the surface 730 from the input signal 710.

Figure 8:
FIG. 8 is a picture illustrating superimposed image quality comparison between the result from a traditional projection under misalignment and a hybrid image projection according to one aspect.

FIG. 8 shows an example result for comparison. On the left side of FIG. 8 is an image that may be displayed by a dual projection system that displays the same superimposed image and on the right side of FIG. 8 is an image that may be displayed by a dual projector system according to some aspects, such as a hybrid image projection system in which the MEMD method is applied. The two displayed images with each dual projector have a 3-pixel misalignment between the superimposed images. The right side image has a sharper image than the left side image.

Figure 9:
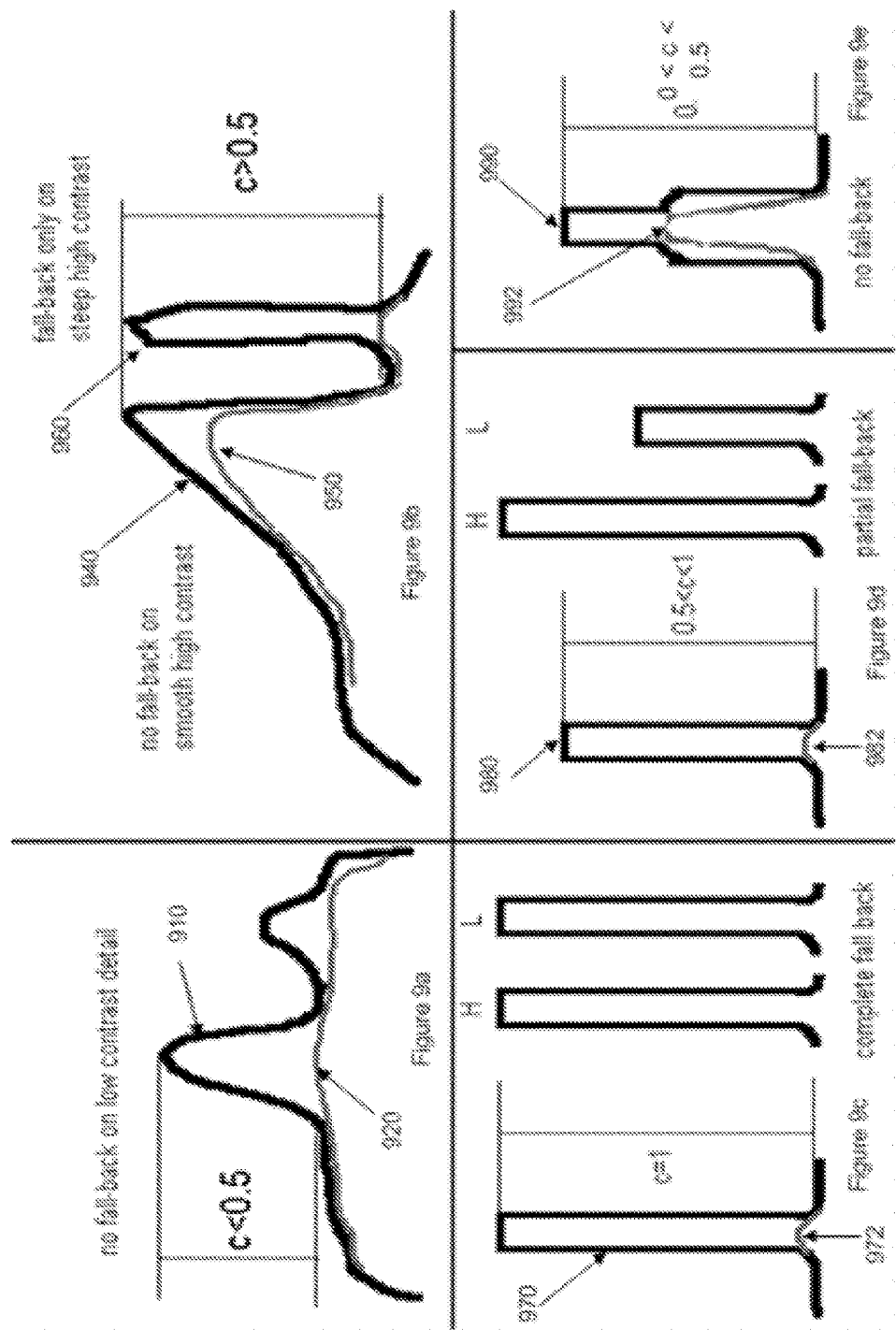
FIGS. 9a-e illustrate conditions when fallback operation is used in the MEMD method according to certain aspects.

FIGS. 9a-e illustrate various conditions when fallback operation may be used in a MEMD method according to some aspects. Fallback can assist in reconstructed image accuracy and fidelity. FIGS. 9a and 9b show curves 910, 940 that represent the value of two superimposed input image pixels from two of the same projectors. The curves 920, 950 represent the first image component L of image curves 910, 940, respectively. The vertical level of the curves represents a linear space intensity of an image pixel in code value for each spatial pixel location represented horizontally. The input pixel values may be in the range of 0 to 1 for curves in FIGS. 9a and 9b. The contrast "c" indicated in FIGS. 9a-e can represent the difference of two pixel value intensities. In FIG. 9a, fallback is not used since, for example, the contrast between the first image component values and the superimposed input image pixel values is equal or less than 0.5. In FIG. 9b, the portion of the input image 960 has a high contrast that is greater than 0.5 and fallback is used.

FIGS. 9c, 9d and 9e represent three fallback cases in which the vertical level of the curves represent an intensity of an image pixel of the superimposed image 2X in code value for each spatial pixel location represented horizontally. FIG. 9c illustrates a complete fallback situation in which the superimposed input image has an intensity value equal to 2. For this case, the value of the first decomposed image component L and the value of the second decomposed image component H is 1. In FIG. 9d, the partial fallback case is illustrated. For this case, the superimposed input image 980 has an intensity value between 1 and 2. The first decomposed image component value can be between 0 and the value of the input image. The second decomposed image component can be 1. The contrast in this situation can be between 0.5 and 1. FIG. 9e illustrates a no fallback situation in which the superimposed input image 990 has an intensity value of less than 1. The first decomposed image component value can be between 0 and 1 and the second decomposed image component value can be between 0 and 1. The contrast in this situation can be less than 0.5. The fallback may be complete fallback if the contrast is equal to 1. In this case, after the fallback pixels are added into the first decomposed image component, the immunity to spatial shifting of the hybrid image projector falls back to the same image quality as superimposing the same image in a dual projection system. Hybrid image projector may not introduce additional artifacts. Other cases are partial fallbacks when fallback occurs as shown in the diagram. Partial fallbacks can lead to a reduced benefit of immunity to spatial shifting in a hybrid image projector, but displaying hybrid images in general can improve the final reconstructed image quality compared to the dual projection system that display two images that are the same.

Figure 10:
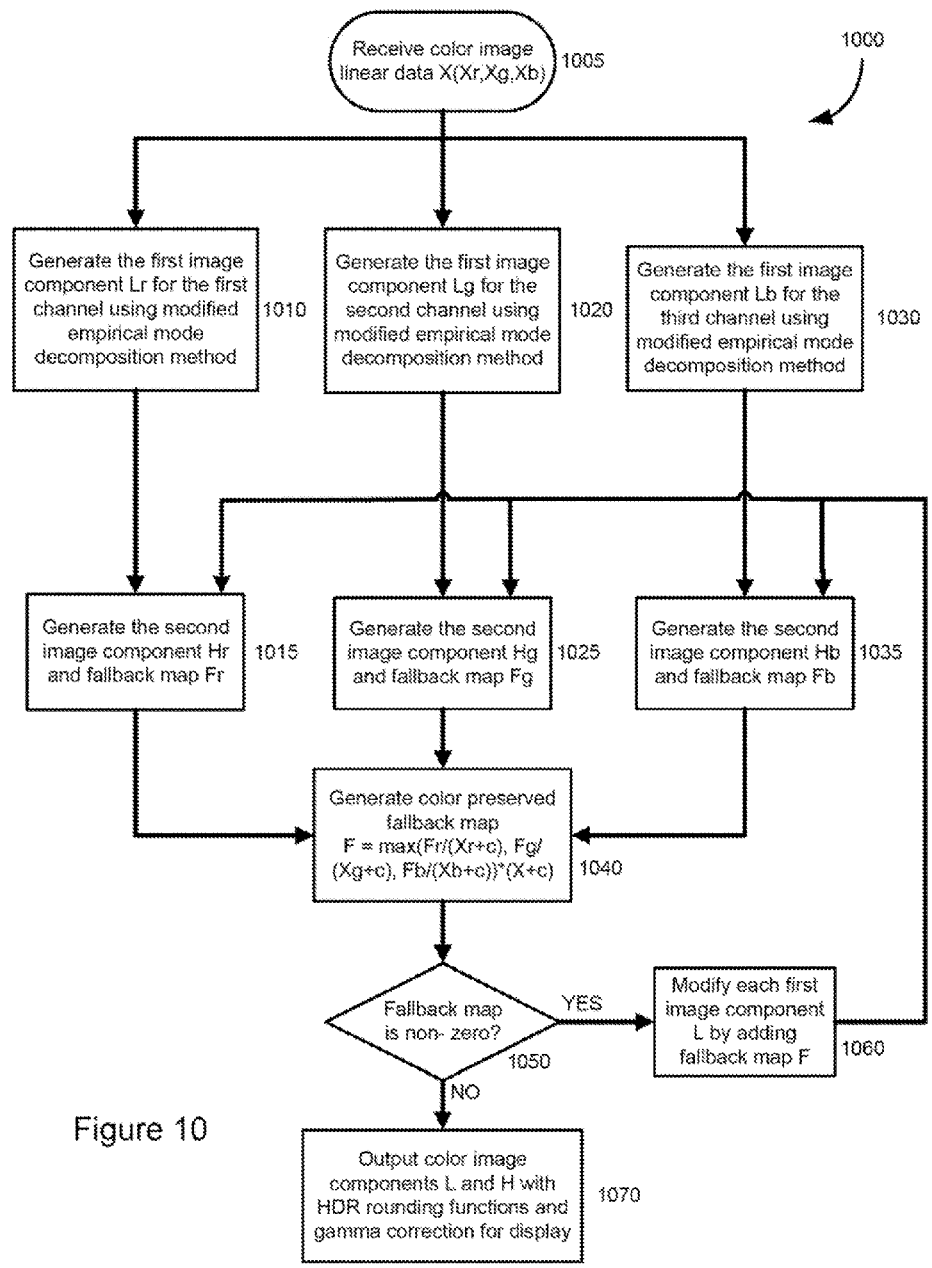
FIG. 10 is a flow chart of a MEMD method in which a three component color image is processed according to one aspect.

Color images can also be processed. FIG. 10 illustrates one example of using a MEMD method for processing a three-component color image. In some aspects, the process can be used for decomposing color image to reduce the risk of having color artifacts when the hybrid image projector undergoes larger pixel shifting. Most color artifacts may come from the fallback pixels that appear as random color artifacts if each color chancel is processed independently by MEMD method when the hybrid image projector undergoes larger pixel shifting. The diagram in FIG. 10 is one method that can be used to ensure fallback pixels in the color image have the consistent color as in the original image. Color image X is received at block 1005, where Xr, Xg, Xb are three color components. Blocks 1010, 1020 and 1030 use the described MEMD method to decompose each color component image into the first image component candidates. At blocks 1015, 1025 and 1035, the second quasi-orthogonal image components are generated and the fallback maps are calculated. The three fallback maps are collected in block 1040, each pixel of each fallback map is then divided by the summation of original pixel value and a small constant c, which may be selected to be less than the half of the discrete quantization step of the image intensities. The maximum pixel ratio among three colors can be selected and used to multiply the summation of original pixel value and constant c to obtain the new estimation of the fallback pixel values for three colors in block 1060. The newly estimated fallback pixels together can form a new fallback map in which each pixel preserves mostly its original hue value, while the color saturation or luminance may have changed. As long as this new fallback map is non-zero, then the new fallback map can be added back to each previous first image component. Because hue-preserving fallback values are added, the pixels modified in the first image component may retain the original appearance, and the intensity and color saturation may change. Subsequent to the process, the overall color artifact under large image misalignment can be reduced and be less visible.

Figure 11:
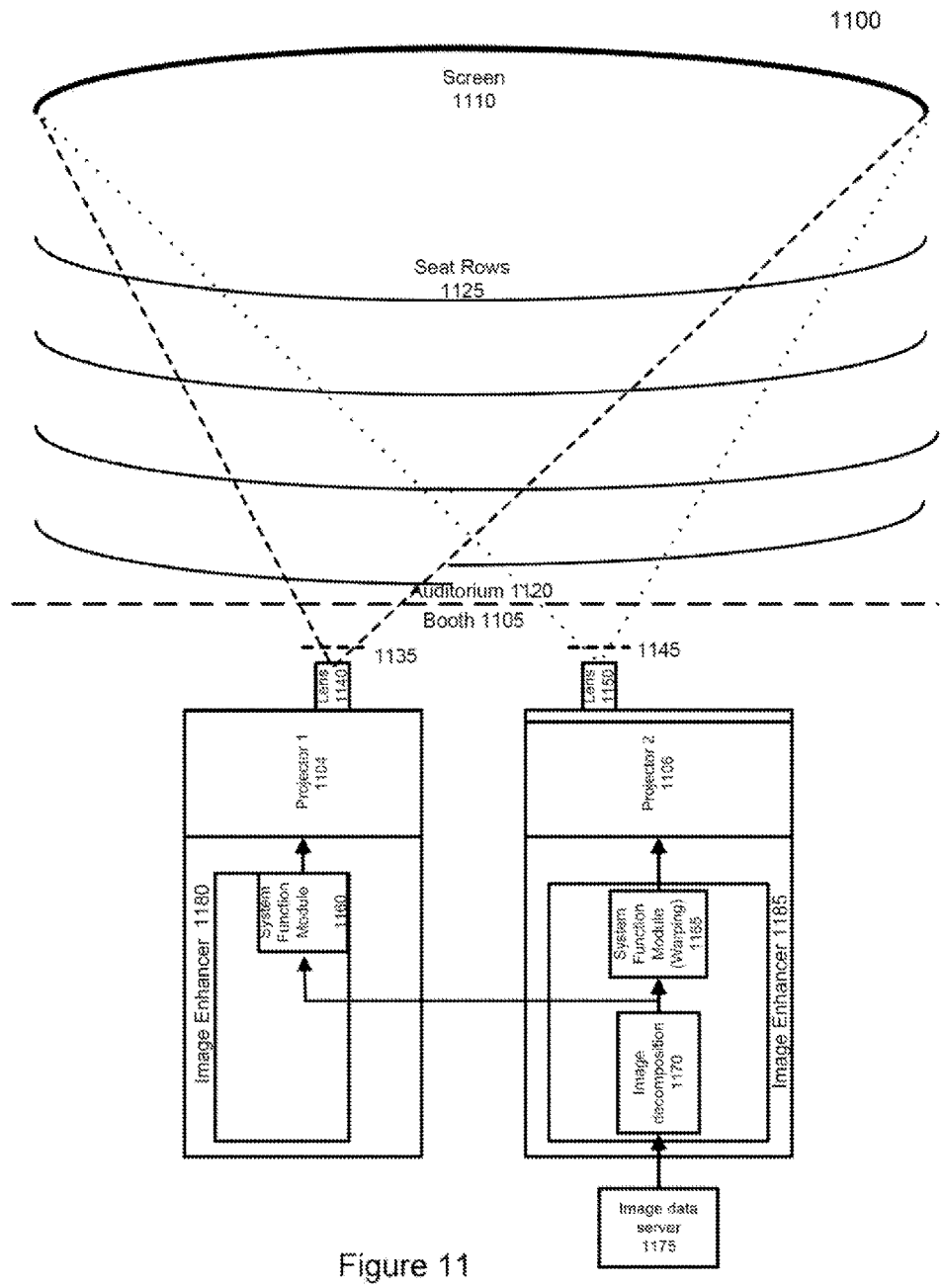
FIG. 11 is a system diagram of a hybrid image projection system having dual projectors according to one aspect.

FIG. 11 illustrates one example of a hybrid projection positioned in a theatre 1100. Superimposed images can be displayed on a screen 1110 in an auditorium 1120 with rows of seats 1125. A projection booth 1105 with dual projectors capable of hybrid projection is provided according to one aspect. The two projectors 1104 and 1106 include image enhancer devices 1180 and 1185, which can have processors for processing image data. In other aspects, the image enhancer can reside in one projector and output the image data to be displayed to the other projector. Image data from image data server 1175 can be received by a processor 1170 to perform image decomposition and can produce orthogonal or quasi-orthogonal image components, such as L and H. The processor that performs image decomposition can also perform other processes, such as region decomposition and degamma image data to linear space. The image data server 1175 can be a playback device or a device that receives and stores image data that is streamed in from a remote location. The image components from image decomposition can be received by a system function module 1160 and 1165 in each projector where additional image data processing, such as HDR or gamma correction or warping, can be performed. In other aspects, the system function modules can reside in one image enhancer in one projector. Processes of the system function modules can be performed by one or more system function modules. Image data from the system function module can then be projected by each projector through the projection lens 1140 and 1150 onto the screen 1110 to form a superimposed image. In some aspects, the dual projectors are hybrid projection system for 2D presentations and/or capable of projecting a 3D presentation with left and right eye image encoding elements 1135 and 1145, respectively. A viewer in a 3D presentation may wear eye glasses that decode the projected and encoded left and right eye images. During a 2D presentation the left and right eye image encoding elements 1135 and 1145 can be removed. In a 3D presentation the input image data may not be decomposed into image components as for a hybrid projection in a 2D presentation. The image enhancer devices 1185 and 1180 can be configured by a user or be capable of automatically detecting when processing of image data is for a 2D presentation with or without hybrid processing or a 3D presentation.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects or features of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

While the present subject matter has been described in detail with respect to specific aspects and features thereof, it will be appreciated that those ordinarily skilled in the art, upon attaining an understanding of the foregoing may readily produce alterations to, variations of, and equivalents to such aspects and features. Accordingly, it should be understood that the present disclosure has been presented for purposes of example rather than limitation, and does not preclude inclusion of such modifications, variations and/or additions to the present subject matter as would be readily apparent to one of ordinarily skilled in the art.

What is claimed is:

1. A method for converting input image data for a hybrid image projection system, the input image data representing a two-dimensional (2D) input image, the method comprising:
    dividing the input image data by region decomposition into at least two image regions based on analysis of content of the input image, each of the at least two image regions being smaller than the input image data;
    determining parameters for the at least two image regions, at least one parameter being an image decomposition parameter determined for each of the at least two image regions and representing optimal adaptation to local image content;
    producing a first image component and a second image component by decomposing the input image based on the parameters, the first image component being orthogonal or quasi-orthogonal with the second image component;
    displaying the first image component by a first display device; and displaying the second image component by a second display device, the second image component being superimposed on the first image component to produce a final superimposed 2D version of the 2D input image with the same or better image quality as the 2D input image and that is brighter than the 2D input image.

2. The method of claim 1, wherein dividing the input image data by region decomposition into at least two image regions based on analysis of content of the input image comprises dividing the input image data into the at least two image regions based on image area texture detail within the input image.

3. The method of claim 1, wherein the at least two image regions comprises a first image region and a second image region having a different size than the first image region.

4. The method of claim 1, wherein producing the first image component and the second image component by decomposing the input image based on the parameters comprises decomposing the input image by:
   interpolating the parameters to produce the first image component; and
   computing a difference between a multiple of the input image and the first image component to produce the second image component.

5. The method of claim 4, wherein the multiple of the input image is based on a number of projectors comprising at least the first display device and the second display device that superimpose at least the first image component and the second image component.

6. The method of claim 1, wherein the final image comprises a brightness that is at least twice as bright as the input image displayed by a single projector system.

7. The method of claim 1, wherein the parameters comprise:
   a first parameter that is a brightness balancing factor; and
   a second parameter that is a minima of each of the at least two image regions,
   wherein producing the first image component comprises:
      modifying the minima of each of the at least two image regions with the first parameter; and
      interpolating the second parameter of each of the at least two image regions into a lower bounding surface using a linear or non-linear process.

8. The method of claim 4, further comprising:
   determining that the first image component is to be modified by analyzing the second image component with respect to predefined limits; and
   responsive to determining that the first image component is to be modified, modifying the first image component and the second image component and computing a difference between the multiple of the input image and a modified first image component.

9. The method of claim 8, wherein the predefined limits are based on brightness.

10. The method of claim 8, wherein the predefined limits are based on preserving original hue.

11. The method of claim 1, further comprising:
   applying the method to each color of the input image data independent of other colors of the input image data.

12. The method of claim 11, wherein the color comprises red, green, and blue.

13. The method of claim 1, further comprising:
   producing image data by applying a degamma process to the input image data.

14. The method of claim 1, further comprising:
   prior to displaying the first image component and displaying the second image component,
      applying a High Dynamic Range rounding function to the first image component and the second image component;
      applying warping to the first image component or the second image component; or
      applying gamma correction to the first image component and the second image component.

15. The method of claim 1, further comprising:
   identifying values of at least one of the first image component or the second image component that are negative or greater than a maximum brightness that the first display device or the second display device is configured to project; and
   reducing visual image artifacts in the at least one of the first image component or the second image component by modifying the values.

16. The method of claim 1, wherein producing the first image component and the second image component by decomposing the input image based on the parameters comprises:
   decomposing the input image using decomposition filters; and
   adjusting the decomposition filters based on content of the input image for each of the at least two image regions.

17. A multiple projector system, comprising:
   an input configured for receiving input image data representing a two-dimensional (2D) image;
   a processor configured for processing the input image data and for outputting a first image component and a second image component based on the input image data by dividing the 2D image, by region decomposition, into image regions based on analysis of image content, determining parameters for the image regions, and decomposing the 2D image into the first image component and into the second image component that is orthogonal or quasi-orthogonal to the first image component, each image region of the image regions being smaller than the input image data, the parameters including an image decomposition parameter determined for each image region of the image regions;
   a system function module configured for modifying the first image component and for modifying the second image component;
   a first projector configured to display the modified first image component; and
   a second projector configured to display the modified second image component superimposed on the modified first image component to produce a final superimposed 2D version of the 2D image with the same or better image quality as the 2D image and that is brighter than the 2D image.

18. The system of claim 17, wherein the processor is configured to apply a degamma process to the input image data.

19. The system of claim 17, wherein the system function module is configured to apply to at least one of the first image component or the second image component, prior to the first image component and the second image component being displayed,
   High Dynamic Range rounding;
   gamma correction; or
   warping.

* * * * *